United States Patent [19]

Barbee

[11] 4,144,614
[45] Mar. 20, 1979

[54] WINDSHIELD WIPER DRIVE SYSTEM
[75] Inventor: Gail G. Barbee, Montgomery, Ill.
[73] Assignee: Caterpillar Tractor Co., Peoria, Ill.
[21] Appl. No.: 872,536
[22] Filed: Jan. 26, 1978
[51] Int. Cl.$^2$ ............................................. B60S 1/22
[52] U.S. Cl. ............................ 15/250.34; 15/250.19;
15/250.3; 296/190
[58] Field of Search ..................... 15/250.16–250.19,
15/250.31–250.35; 296/28 C, 146; 403/359,
365, 368; 74/527; 192/67 R, 65, 93 R; 52/171

[56] References Cited
U.S. PATENT DOCUMENTS

| | | | |
|---|---|---|---|
| 2,046,108 | 6/1936 | Drew | 15/250.31 X |
| 2,743,472 | 5/1956 | Alef | 15/250.1 |
| 3,452,384 | 7/1969 | Scinta | 15/250.1 |
| 4,009,901 | 3/1977 | Barbee | 15/250.34 |

FOREIGN PATENT DOCUMENTS 355521  8/1931  United Kingdom ................... 15/250.31
895757  5/1962  United Kingdom ................... 15/250.3

*Primary Examiner*—Peter Feldman
*Attorney, Agent, or Firm*—Wegner, Stellman, McCord, Wiles & Wood

[57] ABSTRACT

An improved drive system for a windshield wiper suited for use in a vehicle cab structure including a cab frame with at least one window movably mounted on the frame for movement between open and closed positions. A windshield wiper is mounted on the cab frame for wiping the window and a drive is provided for the wiper. A releasable drive connection is disposed between the drive and the wiper and the present invention contemplates the provision of a linkage having a component disposed in the path of movement of the window and another part connected to the releasable drive such that when the window is moved from a closed position to an open position, the drive connection is released so that the wiper cannot be operated with the window in an open position.

6 Claims, 4 Drawing Figures

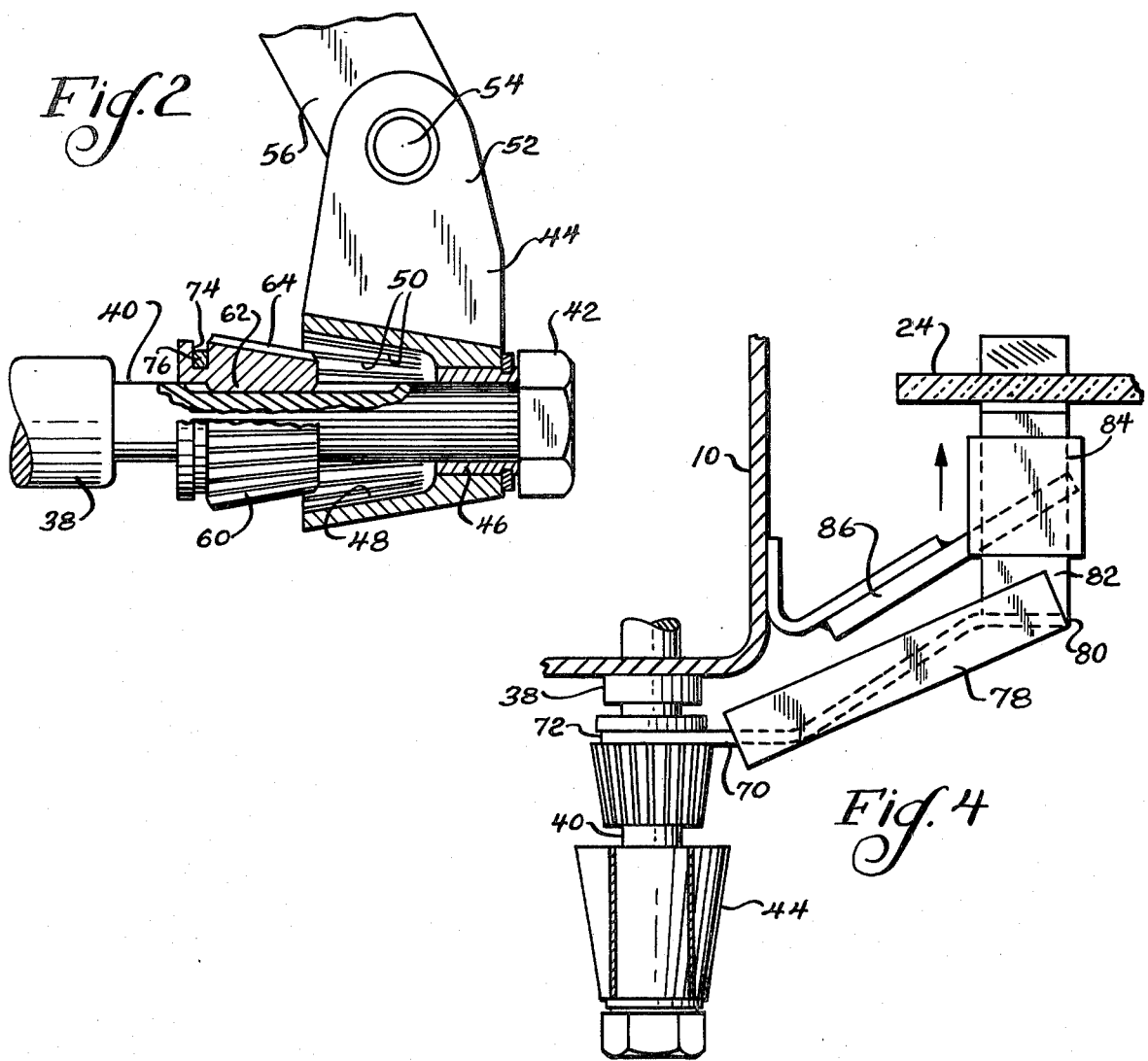
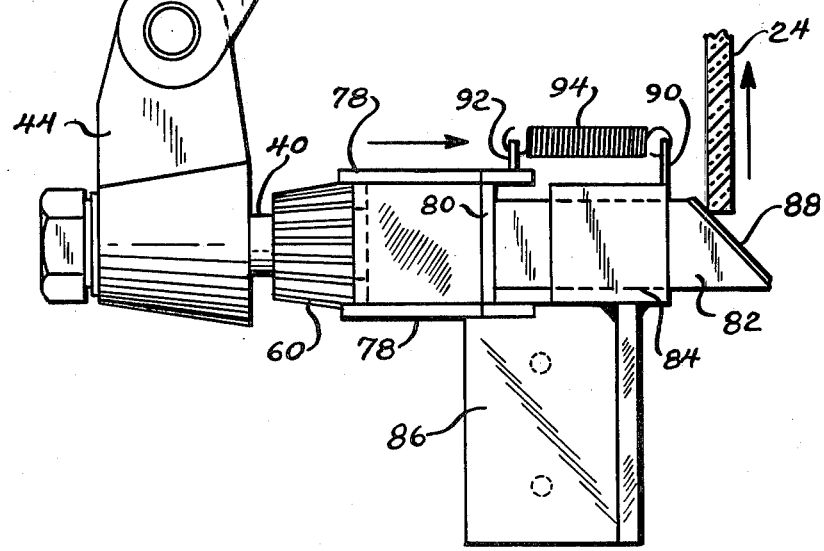

4,144,614

WINDSHIELD WIPER DRIVE SYSTEM

BACKGROUND OF THE INVENTION

This invention relates to windshield wiper drive systems and, more particularly, to drive systems in windshield wipers intended to be used in vehicles having windshields mounted for movement between open and closed positions.

Windshield wipers are almost universally employed on vehicles having windshields for obvious purposes. In most cases, the windshields are substantially permanently fixed in a single position on the vehicle as, for example, in the typical passenger car. However, in some vehicles, the windshields are movably mounted on a cab frame for movement between open and closed positions. Such a construction will be frequently found in construction and farm vehicles having cabs and is to facilitate ventilation of the cab area.

In such vehicles, it is also desirable to provide windshield wipers for the usual reasons and, frequently, some sort of restraint is provided for the windshield wiper for holding the windshield wiper in a particular position when the windshield which it is to wipe is opened so as to prevent biasing forces present in the wiper structure from causing the wiper to enter and move about the operator's face. Where such restraints are utilized, it is highly desirable to provide some sort of means whereby the drive between the windshield wiper motor and the wiper structure can be released when the windshield wiper is engaged with the restraint.

Even if such restraints are not used, it is desirable to prevent movement of the wiper when the windshield is open due to inadvertent energization of the wiper since movement of the wiper within the open windshield area could be extremely distracting to the operator of the vehicle.

Additionally, in some vehicles employing upper and lower windshields, wherein at least the lower windshield is movable between open and closed positions for ventilation purposes, it is desirable to allow one wiper structure to wipe the upper windshield when closed while disabling the windshield wiper for the lower windshield if it is open, such disabling of the lower wiper being desired for the reasons previously stated.

Heretofore, such disablement has been provided by manually releasing the windshield wiper drive from the wiper structure itself by a positive act of the vehicle operator. Should the vehicle operator forget to perform the act, any of the foregoing difficulties may result.

SUMMARY OF THE INVENTION

The present invention is directed to overcoming one or more of the above problems.

According to the present invention, there is provided in a vehicle cab structure including a cab frame, a window movably mounted on the frame between open and closed positions, a windshield wiper mounted on the cab frame for wiping the window, a drive for the wiper, and a releasable drive connection between the drive and the wiper, the improvement including means responsive to movement of the window from the closed position for releasing the drive connection so that drive decoupling will automatically result from the act of opening the window.

Other objects and advantages will become apparent from the following specification taken in connection with the accompanying drawings.

DESCRIPTION OF THE DRAWINGS

FIG. 2 is an enlarged, fragmentary view of a portion of the drive system with parts shown in section for clarity;

FIG. 3 is an enlarged, fragmentary side elevation of the drive system; and

FIG. 4 is a plan view of the drive system with parts omitted for clarity and other parts shown in section.

DESCRIPTION OF THE PREFERRED EMBODIMENT

Figure 1:
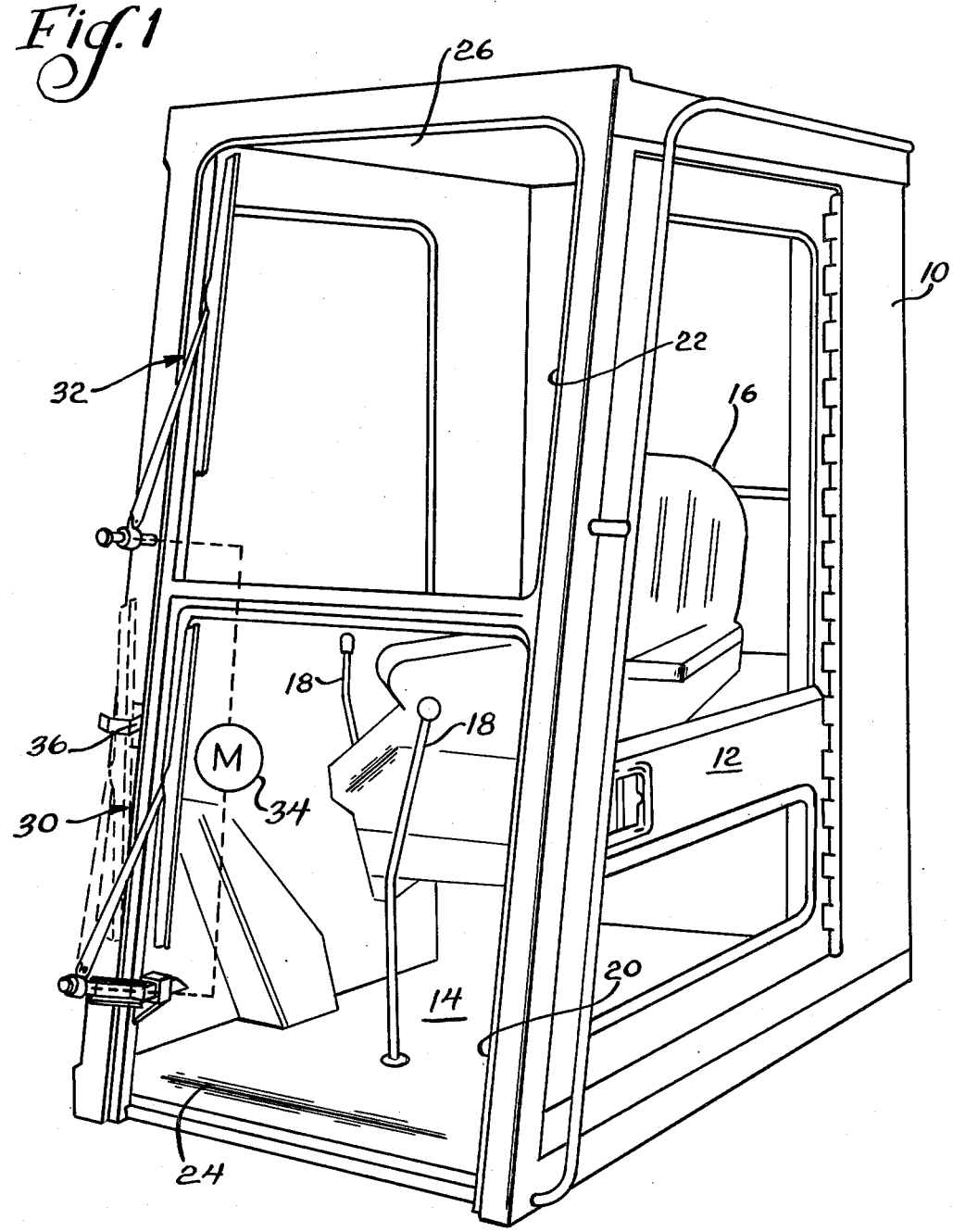
FIG. 1 is a perspective view of a vehicle cab structure mounting a windshield wiper and drive system made according to the invention.

A typical cab structure with which the invention may be employed is illustrated in FIG. 1 and is seen to include a cab frame 10 having a door 12 in one side thereof. The cab frame 10 defines an operator area 14 in which is disposed a seat 16 which may be occupied by the operator. Various controls such as levers 18 are disposed within the area 14 for manipulation by the operator.

The forward side of the cab frame 10 has a lower window opening 20 and an upper window opening 22. Both are closed by glass windows 24 and 26, respectively, and it is considered that at least the lower window 24 may be moved from the position illustrated in FIG. 1 whereat it is closed to another position whereat it is open. In many cases, both of the windows 24 and 26 may be moved from their closed position illustrated to open positions, typically in substantial abutment with the upper surface of the cab frame 10 at the uppermost extent of the operator area 14. The means by which the windows 24 and 26 are so mounted for movement are conventional and form no part of the present invention.

One side of the front of the cab frame 10 mounts lower and upper windshield wipers, designated 30 and 32, respectively. The windshield wipers 30 and 32 are driven by a common drive motor, shown schematically at 34. If desired, a forwardly and sidewardly directed finger 36 may be mounted on the cab frame 10 adjacent the lower wiper structure 30 to receive the same as indicated in dotted lines and restrain it when the lower windshield 24 is in an open position. A similar finger 36 could be utilized in connection with the upper wiper 32, if desired.

Turning now to FIGS. 2-4, inclusive, the specific configuration of the lower wiper 30 will be described. And, while the description concerns itself with the lower wiper 30, and, indeed, in the usual case, the upper wiper 32 will be conventionally configured as opposed to having the structure disclosed hereinafter, it is to be understood that in some instances, similar structure could be employed with the upper wiper 32.

The cab frame 10, on its forward side, mounts a forwardly extending bushing 38 through which a drive shaft 40 for the wiper extends. The drive shaft 40 is coupled to the motor 34 in any conventional fashion so as to undergo oscillating, rotary motion about its axis. As illustrated, the drive shaft 40 may be in the form of a bolt having a head 42 along with other structure to be described hereinafter.

A wiper arm mounting head 44 is journalled on the shaft 40 adjacent the bolt head 42 by means of a bearing 46. The head 44 includes a generally frusto-conical recess 48 disposed concentrically about the shaft 40 and opening away from the bolt head 42. The surface of the recess 48 serves as a clutch surface and to ensure against slipping, may be provided with a plurality of radially inwardly directed splines 50. A yoke 52 comprises part of the mounting head 44 and, by means of a pivot pin 54 mounts a wiper arm 56 in a conventional fashion.

A clutch structure 60 is mounted on the shaft 40 for axial reciprocation thereon. The clutch structure 60 is also precluded from rotating relative to the shaft 40. This is accomplished through the provision of interengaging splines 62 on the exterior shaft 40 and on the interior of the clutch structure 60. The splines need not take on any special form, but in the usual case, may be in the form of opposed flats on the sides of the shaft 40 and similar flats on the interior of the clutch structure 60.

As seen in FIG. 2, the right-hand end of the clutch structure 60 is generally frusto-conical and includes radially outwardly directed splines 64 which, when the clutch structure 60 is moved to the right, as viewed in FIG. 2, along the shaft 40, will interengage with the splines 50 within the mounting head 44 to establish a driving connection therebetween. Because the clutch structure 60 cannot rotate relative to the shaft 40, when the shaft 40 is being driven by the motor 34, and when the clutch surface defined by the splines 64 engages the clutch surface defined by the splines 50, the wiper arm 56 will be oscillated in the usual fashion.

An actuator for the clutch structure 60 is provided as best seen in FIGS. 3 and 4. An S-shaped arm 70 has an end 72 mounted on the clutch structure 60 so as to permit relative rotation between the two but prevent substantial axial relative movement. As seen in FIG. 2, the left-hand end of the clutch structure 60 is provided with a peripheral groove 74 which receives fingers 76 on the end 72 of the arm 70. Consequently, it will be appreciated that movement of the arm 70 in a path parallel to the axis of the shaft 40 will engage or disengage the clutch, depending upon the direction of such movement.

For strengthening purposes, the arm 70 is provided with upper and lower strengthening plates 78 and the end 80 of the arm 70 remote from the end 72 is affixed to a cam 82. The cam 82 is mounted for reciprocal movement in a rectangular tube 84 positioned in close proximity to the lower windshield 24 by a mounting bracket 86 extending from the cab frame 10. The cam 82 extends through the tube 84 to dispose a diagonal cam surface 88 in the path of movement of the lower windshield 24, as seen in FIGS. 3 and 4. Upwardly extending tabs 90 and 92 on the tube 84 and upper plate 78, respectively, mount a coil spring 94 which biases the cam 82, and thus the arm 70, to the right, as viewed in FIG. 3, and upwardly as viewed in FIG. 4. In other words, the spring 94 provides a bias to dispose the cam surface 88 in the path of movement of the lower windshield 24 which will cause the clutch structure 60 to move away from the mounting head 44 to disengage the clutch.

When the windshield 24 is in its closed position, the lower edge thereof will have moved past the cam 82 thereby moving the same from the position illustrated in FIG. 3 to the left to engage the clutch 60 so that the windshield wiper 30 will wipe the windshield 24. Conversely, when the windshield 24 is moved upwardly towards its open position and from its closed position, the bias of the spring 94 will cause the cam 82 to move to the position shown in FIG. 3, when it is no longer blocked from such movement by the windshield 24, to disengage the clutch and preclude actuation of the wiper 30 when the windshield 24 is open.

It will be observed that engagement and disengagement of the wiper drive to the wiper occurs automatically in response to the opening and closing of the windshield 24. It will also be appreciated that in the preferred embodiment, as illustrated in the drawings, the lower windshield 24 may be open while the upper windshield 26 remains closed and only the lower wiper 30 will be disabled, the upper wiper 32 being operable to sweep the upper windshield 26.

From the foregoing, it will be appreciated that a windshield wiper drive system made according to the invention is economical to manufacture and overcomes difficulties encountered with prior drive systems. The same is easily serviced, particularly when the shaft 40 is formed much like a bolt since it is only necessary to remove the same through the application of a suitable rotative force to the head 42 to achieve full access to all components of the system.

The embodiments of the invention in which an exclusive property or privilege is claimed are defined as follows:

1. In a vehicle cab structure including a cab frame, a window movably mounted on said frame between open and closed positions, a windshield wiper mounted on the cab frame for oscillating wiping movement thereon across the window, a drive for oscillating the wiper and a releasable drive connection between the drive and the wiper, the improvement comprising means responsive to movement of said window from said closed position for releasing said drive connection.

2. In a vehicle cab structure including a cab frame, two windows on the frame, at least one of which is movable between open and closed positions, a pair of windshield wipers, one for each window, a common drive for oscillating each of said wipers across the associated window, and a releasable drive connection between said drive and said wipers, the improvement comprising means responsive to movement of said one window from said closed position for releasing said drive connection.

3. The vehicle cab structure of claim 2 wherein said drive connection comprises a clutch and said responsive means comprises a clutch actuator having a portion disposed in the path of movement of said one window.

4. The vehicle cab structure of claim 3 wherein said clutch is normally disengaged and wherein said clutch actuator portion is engaged by said one window when in said closed position to engage said clutch.

5. The vehicle cab structure of claim 3 wherein said clutch actuator portion has a cam surface facing said one window to be engaged by an edge of said window.

6. A windshield wiper drive structure comprising:
a rotatable drive shaft adapted to be coupled to a drive motor and journalled on a vehicle in proximity to a movable windshield;
a wiper arm mounting structure journalled on said drive shaft and having a first clutch surface concentric with said shaft;
a movable clutch structure mounted for axial reciprocation on said shaft and for rotation with said shaft, said clutch structure including a second clutch surface facing said first clutch surface and movable with said clutch structure into driving engagement with said first clutch surface; and
an actuator for moving said clutch structure including an arm, means connecting said arm to said clutch structure so as to (a) allow relative rotation and (b) prevent relative axial shifting between the arm and the clutch structure, a cam surface carried by said arm and adapted to be located in the path of the movable windshield to be engaged thereby to move said clutch structure in one direction on said shaft, and means biasing said clutch structure in the opposite direction on said shaft.

* * * * *